(No Model.)

H. R. RANDALL.

APPARATUS FOR TREATING FIBER PLANTS OR MATERIAL FOR THE PRODUCTION OF FIBER.

No. 342,842. Patented June 1, 1886.

Witnesses:
E. F. Tourtellotte.
Charles Mac Innes.

Inventor.
Henry R Randall
By
James A Whitney,
Attorney

UNITED STATES PATENT OFFICE.

HENRY R. RANDALL, OF BROOKLYN, NEW YORK.

APPARATUS FOR TREATING FIBER PLANTS OR MATERIAL FOR THE PRODUCTION OF FIBERS.

SPECIFICATION forming part of Letters Patent No. 342,842, dated June 1, 1886.

Application filed November 11, 1885. Serial No. 182,464. (No model.)

*To all whom it may concern:*

Be it known that I, HENRY R. RANDALL, of Brooklyn, in the county of Kings and State of New York, have invented certain Improvements in Apparatus for Treating Fiber Plants or Material for the Production of Fibers, of which the following is a specification.

This invention is designed to provide a simple and efficient apparatus for the treatment of fiber plants or material with solvents and chemical agents to insure the separation of the fibers from the woody material preparatory to their mechanical treatment for the production of yarns, fabrics, &c.; and my said invention comprises certain new and useful combinations of parts, whereby said object is effectually secured.

Figure 1:
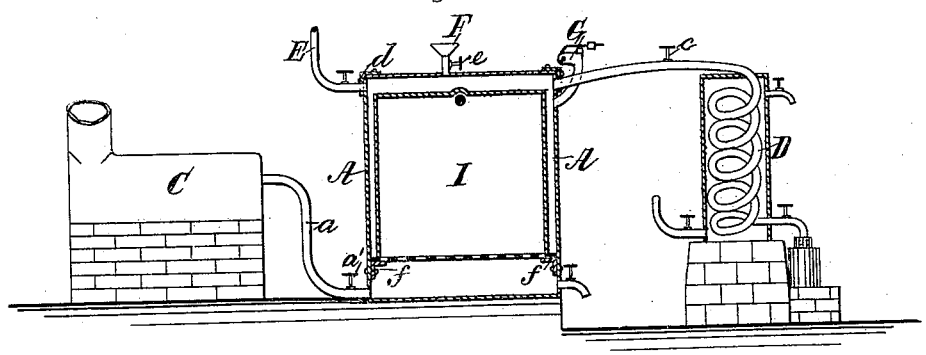
Figure 2:
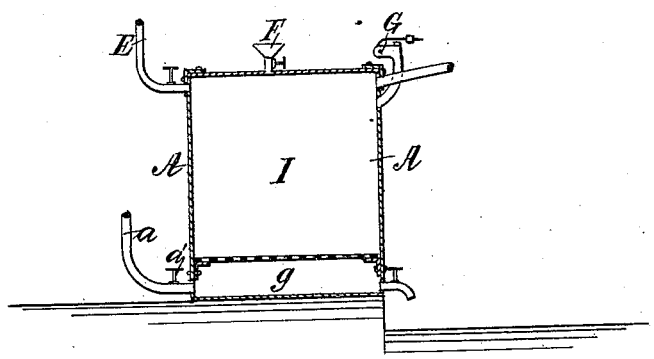

Figure 1 is a vertical longitudinal sectional view of an apparatus embracing the several features of my said invention, and Fig. 2 is a similar view of one part of said apparatus in a modified form.

A is a tank of any suitable size, shape, and material.

C is a steam-boiler connected with the tank by steam-pipe $a$, having a cock, $a'$, and broadened to admit steam to the tank to vaporize the hydrocarbon, and to boil the alkali, as hereinbefore explained.

D is the condenser, which may be of the same construction as the condenser of an ordinary still, and is provided with a cock, C, by which communication between the tank and condenser may be closed or opened.

E is an inlet-pipe having a cock, $d$, and through which water may be introduced to the tank, the water being brought to the boiling temperature when received by the admission of steam to the tank.

F is a funnel-inlet provided with a cock, $e$, and through which the solvents and chemical solutions may be introduced to the tank, and G is a safety-valve to prevent danger of explosion from the accumulation of pressure within the tank.

As shown in Fig. 1, the tank is provided with an internal cage or basket foraminated at its bottom or sides, or both, and resting on brackets or supports $f$ at some little space above the bottom of the tank. By means of said cage or basket the material may be more conveniently removed from the tank. When such cage or basket is dispensed with, the tank should be provided with a foraminated false bottom, $g$, as shown in Fig. 2.

The several combinations of parts included in this apparatus may be used with advantage in any treatment of fibrous or fiber-producing material in which the material is subjected to the action of heated water or solutions, to steam, or to the vapors of solvents, or to the action of condensable solvents.

What I claim as my invention is—

1. The combination of the tank A, condenser D, steam-boiler C, water-inlet E, and connecting pipes and cocks, all substantially as and for the purpose herein set forth.

2. The combination of the tank A, condenser D, steam-boiler C, connecting pipes and cocks, water-inlet pipe E, and inlet F, having cock $e$, all substantially as and for the purpose herein set forth.

3. The combination of the tank A, cage or basket, condenser D, steam-boiler C, and connecting pipes and cocks, all substantially as and for the purpose herein set forth.

HENRY R. RANDALL.

Witnesses:
JOHN G. HOUEY,
CHAS. MACINNES.